United States Patent
Kujala et al.

(10) Patent No.: US 11,155,438 B2
(45) Date of Patent: Oct. 26, 2021

(54) DIAGNOSTICS SOLUTION FOR ELEVATORS

(71) Applicant: Kone Corporation, Helsinki (FI)

(72) Inventors: Matti Kujala, Helsinki (FI); Eero Putkinen, Helsinki (FI); Matti Naapuri, Helsinki (FI); Markus Nivala, Helsinki (FI); Toni Toivanen, Helsinki (FI); Van Minh Vu, Helsinki (FI)

(73) Assignee: Kone Corporation, Helsinki (FI)

( * ) Notice: Subject to any disclaimer, the term of this patent is extended or adjusted under 35 U.S.C. 154(b) by 498 days.

(21) Appl. No.: 16/156,444

(22) Filed: Oct. 10, 2018

(65) Prior Publication Data

US 2019/0112152 A1    Apr. 18, 2019

(30) Foreign Application Priority Data

Oct. 17, 2017 (EP) .................................... 17196848

(51) Int. Cl.
*B66B 5/00* (2006.01)
*G01N 21/88* (2006.01)
*H04N 5/247* (2006.01)

(52) U.S. Cl.
CPC .......... *B66B 5/0025* (2013.01); *B66B 5/0018* (2013.01); *G01N 21/8851* (2013.01); *H04N 5/247* (2013.01)

(58) Field of Classification Search
CPC ........................... B66B 5/0025; B66B 5/0018; G01N 21/8851; H04N 5/247
See application file for complete search history.

(56) References Cited

U.S. PATENT DOCUMENTS

| 2004/0011595 A1* | 1/2004 | Hong ..................... B66B 3/02 187/391 |
| 2012/0024638 A1* | 2/2012 | Poutiainen ............. B66B 1/463 187/395 |

(Continued)

FOREIGN PATENT DOCUMENTS

| EP | 3409629 A1 * | 5/2018 |
| JP | 03243581 A  * | 10/1991 |

(Continued)

OTHER PUBLICATIONS

European Search Report for European Patent Application No. 17196848 dated May 17, 2018.

*Primary Examiner* — Michael Robert Cammarata
(74) *Attorney, Agent, or Firm* — Harness, Dickey & Pierce, P.L.C.

(57) ABSTRACT

The invention relates to a solution for diagnosing an operational condition of at least one device of an elevator car. The solution comprises the at least one device, an image capturing device, at least one reflective surface arranged to a position in an elevator car forming a path of reflection between the image capturing device and a portion of the at least one device, and a control device, In the solution the at least one device is caused to set the operating state and the image capturing device is configured to capture an image at least on the portion of the at least one device seen by the image capturing device through the at least one reflective surface, the image data is analyzed and based on that the operational condition of the device is concluded.

19 Claims, 3 Drawing Sheets

(56) References Cited

U.S. PATENT DOCUMENTS

| | | | |
|---|---|---|---|
| 2018/0044132 A1* | 2/2018 | Fauconnet | B66B 1/28 |
| 2018/0282112 A1* | 10/2018 | Mahoney | B66B 1/3461 |
| 2018/0304807 A1* | 10/2018 | Boesch | B60Q 11/005 |
| 2019/0177122 A1* | 6/2019 | Mahoney | B66B 1/466 |
| 2020/0062539 A1* | 2/2020 | Carriero | H04L 65/1069 |

FOREIGN PATENT DOCUMENTS

| | | | |
|---|---|---|---|
| JP | H1149457 A | | 2/1999 |
| JP | 2004338858 A | * | 12/2004 |
| JP | 2011011872 A | | 1/2011 |
| JP | 2013216409 A | * | 10/2013 |
| JP | 2016113247 A | * | 6/2016 |
| JP | 2016179904 A | * | 10/2016 |
| KR | 101023153 B1 | * | 3/2011 |

* cited by examiner

DIAGNOSTICS SOLUTION FOR ELEVATORS

This application claims priority to European Patent Application No. EP171968480 filed on Oct. 17, 2017, the entire contents of which are incorporated herein by reference.

TECHNICAL FIELD

The invention concerns in general the technical field of elevators. More particularly, the invention concerns diagnostics of the elevators.

BACKGROUND

Elevators comprise a plurality of operating entities which may break up at some point of time. Most of the operating entities, especially those having critical role in the operation of the elevator, are usually equipped with safety circuits which are configured to detect malfunction in the operation of the corresponding entity and in response to the detection to initiate predetermined operations, such as preventing use of the elevator. However, the elevators comprise also entities, which are not necessarily critical to the operation, or are functioning so that the malfunction does not have any operational effect to the operation of the elevator, but it may disturb users of the elevator and/or cause negative effect on a brand of the elevator manufacturer as well as building representative, such as management and/or owner.

An example of an entity not having a critical role, or at least in view of a safety, to an overall operation of the elevator may be a user interface device residing in an elevator car. The user interface device in the elevator context is typically called a car operating panel (COP). The COP provides an interface for the users to interact with the elevator system. The interaction may e.g. refer to providing a destination call to the elevator system.

The COP may comprise a plurality of devices, such as buttons comprising a light source, for indicating user selection in the elevator car. For example, in some implementation the COP may comprise a button for each destination floor and the user, i.e. the passenger, selects the destination floor by activating the button corresponding the destination floor. In some modern elevator solutions, the COP may be implemented with a touch screen panel. The touch screen panel is configured to provide options for the users as digital images displayed on the screen and a location of the user's touch on the screen is determined and based on that the desired operation is executed.

The COP may get broken in one way or another. Some failures may be that big, which prevent the use of the COP in question totally. On the other hand, some other failures may be minor and create only dissatisfaction among the users. For example, a light source of some button may get broken, but the signaling in response to the activation of the button works properly. In such a situation the user may get confused if his/her selection is not acknowledged by the elevator system at all, because the light of the button does not confirm it. In case of the touch screen some portion of the touch screen may get broken and the touch screen cannot properly display the intended information, which again may cause dissatisfaction among the users.

The existing solutions for detecting the malfunctions are based on a visual check by a service technician. The visual check is done regularly scheduled service visit. Naturally, the users may also report on malfunctions especially if the malfunction is such that it may be detected by the users of the elevator. As is directly derivable this kind of manual diagnostics is resource consuming. Additionally, it may cause delays in detecting the malfunctions due to the schedule of the service visit.

Hence, there is need to develop sophisticated solutions for diagnosing elevator elements, especially elements residing in the elevator car.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present an arrangement and a method for diagnosing an operational condition of at least one device of an elevator car.

The objectives of the invention are reached by an arrangement and a method as defined by the respective independent claims.

According to a first aspect, an arrangement for diagnosing an operational condition of at least one device of an elevator car is provided, the at least one device is a device having at least two operating states wherein the operating states are distinguishable from each other with at least one visual representation generated by the at least one device, wherein the arrangement comprises: an image capturing device; at least one reflective surface arranged to a position in an elevator car forming a path of reflection between the image capturing device and a portion of the at least one device; a control device for generating a first control signal to the at least one device to set the operating state of the at least one device; the control device is configured to: generate a second control signal to the image capturing device in response to the generation of the first control signal to the at least one device to set the operating state of the at least one device, the second control signal to the image capturing device is configured to cause the image capturing device to capture an image at least on the portion of the at least one device seen by the image capturing device through the at least one reflective surface; detect, from the data representing the captured image, if the visual representation generated by the at least one device is set in accordance with the first control signal; and set, in accordance with a detection, a detection result to express one of the following: i) the operational condition of the at least one device is normal, ii) the operational condition of the at least one device deviates from the normal.

The control device may be configured to express the operational condition of the at least one device as normal in response to a detection that the visual representation is set in accordance with the first control signal.

The control device may also be configured to perform detection if the visual representation generated by the at least one device is set in accordance with the first control signal by comparing the visual representation generated by the at least one device to a reference data. The reference data may be one of the following: at least one reference data value comparable to at least one value derivable from the data representing the captured image, reference image data. The control device may be configured to retrieve the reference data from a memory accessible to the control device. Furthermore, the control device may be configured to generate the reference image data, prior to a generation of the first control signal to the at least one device to set the operating state of the at least one device, by generating a prior control signal to the image capturing device for capturing an image at least on the portion of the at least one device seen by the image capturing device through the at least one reflective surface.

The control device may further be configured to, prior to capturing of the image, to generate an adjustment control signal for adjusting the diagnostics environment in the elevator car. An adjustment of the diagnostics environment may comprise at least one of the following: adjusting a parameter affecting to at least one characteristic of the visual representation generated by the at least one device, adjusting a lighting of the elevator car.

Moreover, the control device may be configured to generate a triggering signal for initiating the diagnosing of the operational condition of the at least one device based on at least one of the following: pre-defined time scheme for the triggering signal, detection that the elevator car is not occupied, operating mode of the elevator car.

An elevator car control panel may comprise at least one of the following: least one device, the image capturing device.

According to a second aspect, a method for diagnosing an operational condition of at least one device of an elevator car is provided, the at least one device is a device having at least two operating states wherein the operating states are distinguishable from each other with at least one visual representation generated by the at least one device, wherein the method comprises: generating, by a control device, a first control signal to the at least one device to set the operating state of the at least one device; generating, in response to the generation of the first control signal to the at least one device to set the operating state of the at least one device, a second control signal to the image capturing device, the second control signal to the image capturing device is configured to cause the image capturing device to capture an image at least on the portion of the at least one device seen by the image capturing device through the at least one reflective surface; detect, from the data representing the captured image, if the visual representation generated by the at least one device is set in accordance with the first control signal; and set, in accordance with a detection, a detection result to express one of the following: i) the operational condition of the at least one device is normal, ii) the operational condition of the at least one device deviates from the normal.

The method may further comprise: expressing, by the control device, the operational condition of the at least one device as normal in response to a detection that the visual representation is set in accordance with the first control signal. Detection if the visual representation generated by the at least one device is set in accordance with the first control signal may be performed by comparing the visual representation generated by the at least one device to a reference data. The reference data may be one of the following: at least one reference data value comparable to at least one value derivable from the data representing the captured image, reference image data. The method may further comprise: retrieving, by the control device, the reference data from a memory accessible to the control device. Moreover, the method may further comprise: generating, by the control device, the reference image data, prior to a generation of the first control signal to the at least one device to change the operating state of the at least one device, by generating a prior control signal to the image capturing device for capturing an image at least on the portion of the at least one device seen by the image capturing device through the at least one reflective surface.

Further, the method may comprise: generating, by the control device prior to capturing of the image, an adjustment control signal for adjusting the diagnostics environment in the elevator car. An adjustment of the diagnostics environment may comprise at least one of the following: adjusting a parameter affecting to at least one characteristic of the visual representation generated by the at least one device, adjusting a lighting of the elevator car.

The method may further comprise: generating, by the control device, a triggering signal for initiating the diagnosing of the operational condition of the at least one device based on at least one of the following: pre-defined time scheme for the triggering signal, detection that the elevator car is not occupied, operating mode of the elevator car.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Elevators having elevator cars comprises entities which are configured to interact with a user of the elevator in one way or another. At least one entity inside the elevator car interacting with the user of the elevator is a car operating panel (COP). The car operating panel typically comprises at least one device by means of which the user may indicate his/her need to the elevator system and/or receive information from the elevator system. In view of the present invention the information output by the elevator system through the car operating panel to the user refers to a visual representation. For sake of clarity, the term visual representation shall be understood to cover any way to inform on at least one operating state of the device. For example, it may be a light signal generated by the device, or the operating state of the device may be indicated without any signal, i.e. the device is dark or does not generate any indication.

Figure 1:
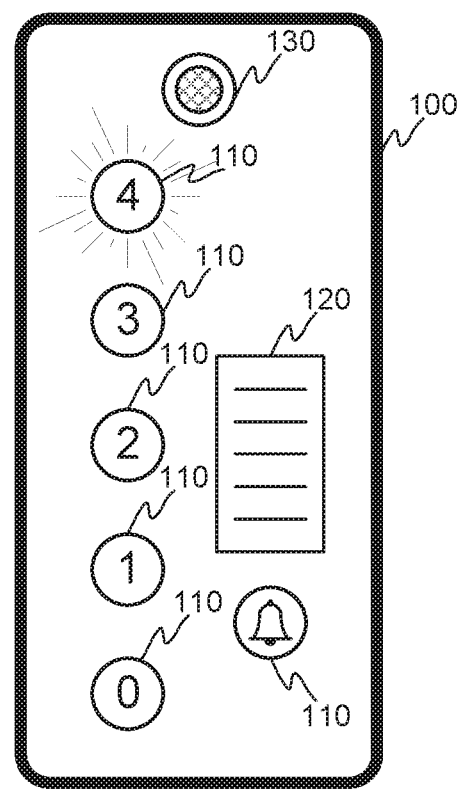
FIG. 1 illustrates schematically a non-limiting example of the car operating panel applicable in a context of the invention.

FIG. 1 schematically illustrates a non-limiting example of the car operating panel (COP) 100 which may be utilized in an arrangement according to the present invention. The COP may comprise a number of devices 110, such as buttons, which enable interaction between the user of the elevator and the elevator system. The devices 110 may be configured to generate a visual representation when they are operating in a normal operation i.e. as is default for the device 110. For example, the user may indicate a destination floor with the devices 110 by performing a user action which causes an indication. In the context of buttons, the user may touch the button and in that manner provide a necessary pressure, or any other effect, such as a resistive, a capacitive or an inductive effect, to the button in order to make the button to change its state. In response to the change of the state the device 110 may generate an indication signal towards a control device, but it may also generate a visual representation, such as light indication, which informs the user that the desired indication in response to the user interaction with the COP is received by the elevator system. In FIG. 1 the button representing a destination floor 4 generates the visual representation in order to express that it is activated by a user selection. The COP 100 may comprise further devices, such as a microphone and a loudspeaker 120 for enabling a communication between the user and service personnel if needed. Moreover, the COP 100 may comprise an image capturing device 130, such as a digital camera. The image capturing device 130 may be implemented to the COP structure and arranged on the same wall in the elevator car as where the COP 100 is mounted to. In an advantageous solution the COP module comprises the image capturing device 130.

The COP 100 as schematically illustrated in FIG. 1 is a non-limiting example of the COP applicable to be utilized in the context of the present invention. In some other embodiment of the invention the COP may be implemented with a so-called touch screen. The touch screen may be arranged to display a number of symbols selectable by the users of the elevator e.g. by touching the symbol to be selected. The selection is detected by the touch screen and the selection may be indicated on the touch screen e.g. with a visual representation. The COP 100 implemented with a touch screen may also comprise an image capturing device implemented in the same manner as the schematically illustrated in FIG. 1 or the image capturing device 130 may be a separate entity to the COP 100 implemented with the touch screen.

The arrangement according to the present invention enables diagnosing an operational condition of at least one device of the elevator control panel (COP) 100, which device may generate a visual representation representing its operation. In other words, the generation of the visual representation is part of a normal operation of the device i.e. when the device functions properly. If the visual representation is not generated in response to a predetermined action, such as in response to an activation/inactivation of the device or in response to a change of an operational state of the device, its operation deviates from normal.

Figure 2:
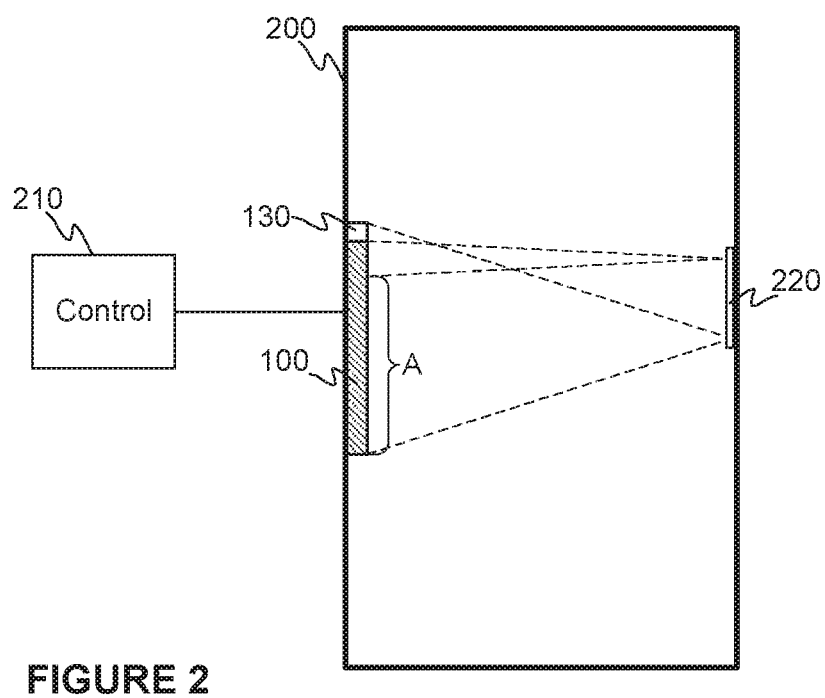
FIG. 2 illustrates schematically an arrangement according to an embodiment of the invention.

Next, an exemplifying arrangement according to the present invention is discussed by referring to FIG. 2 in which a sideway view of an elevator car 200 is schematically illustrated wherein the arrangement is implemented to. As illustrated in FIG. 2 the COP 100 is arranged on a wall of the elevator car 200. The COP may be equipped with an image capturing device 130. As discussed, the image capturing device 130 may be a separate entity to the COP 100 or implemented in the COP 100. The COP 100 and the image capturing device 130 may be communicatively coupled to a control device 210, which may be configured to control the overall operation of the arrangement through generating control signals to the mentioned entities. The control device 210 may also be configured to obtain information, e.g. in a form of digital data, from the COP 100 and the image capturing device 130 therein. For example, the obtained information may e.g. be an indication of the user selection given with the at least one device 110 in the COP 100 or image data captured with the image capturing device 130. The arrangement according to the invention also comprises a reflective surface 220. The reflective surface 220 is positioned in the elevator car 200 so that the image capturing device 130 may capture an image on at least portion of the COP 100 (referred with A in FIG. 2) through the reflective surface 220. The portion of the COP 100 is advantageously selected so that the image capturing device 130 sees at least a desired portion of a device 110 under diagnose through the reflection. Naturally, by adjusting the size of the reflective surface 220, and possibly also the position, the portion visible to the image capturing device through the reflection may be adjusted. In some embodiment the mentioned entities are selected and arranged so that the image capturing device 130 may capture an image disclosing the whole COP.

The reflective surface 220 may e.g. be a mirror arranged in the elevator car 200 so that the image capturing device 130 may capture image through it on at least portion of the COP 100. Generally speaking the reflective surface 220 may be manufactured from any material, which is suitable for reflecting light on a level which enables performing diagnostics of the device in question. For example, in some embodiment it may be necessary to distinguish patterns from the reflected image and it may mean that the reflection coefficient of the material of the reflective surface shall be high. In some other embodiment it may be enough to determine if the device generates a visual representation, e.g. if a light source of the device is active or not, and in that case the reflective surface may be manufactured from a material having a lower reflection coefficient. Hence, the material of the reflective surface is to be selected according to needs of the diagnostics system. The implementation of the reflective surface 220 in the arrangement may be performed with a separate part, such as with a reflective panel, or an elevator wall may be treated with an applicable paint or lacquer or any other substance, which coats the wall, or at least portion of it, so that visual representation generated by the device is reflected to the image capturing device in an appropriate manner.

Figure 3:
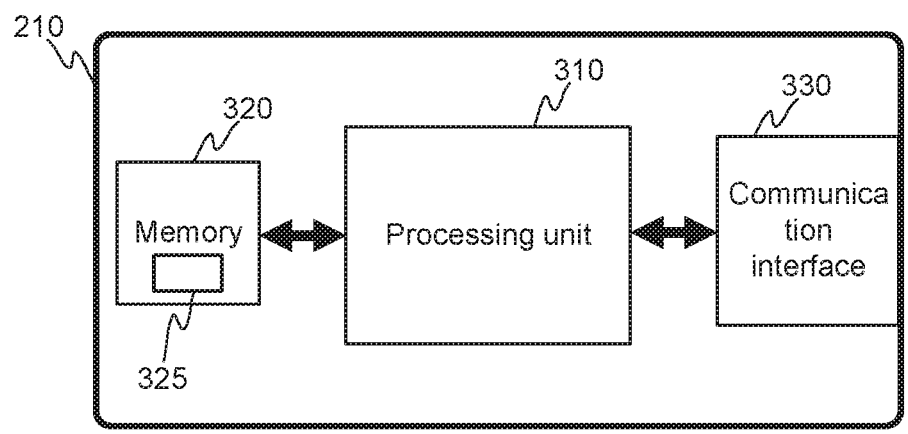
FIG. 3 illustrates schematically a control device according to an embodiment of the invention.
Figure 4:
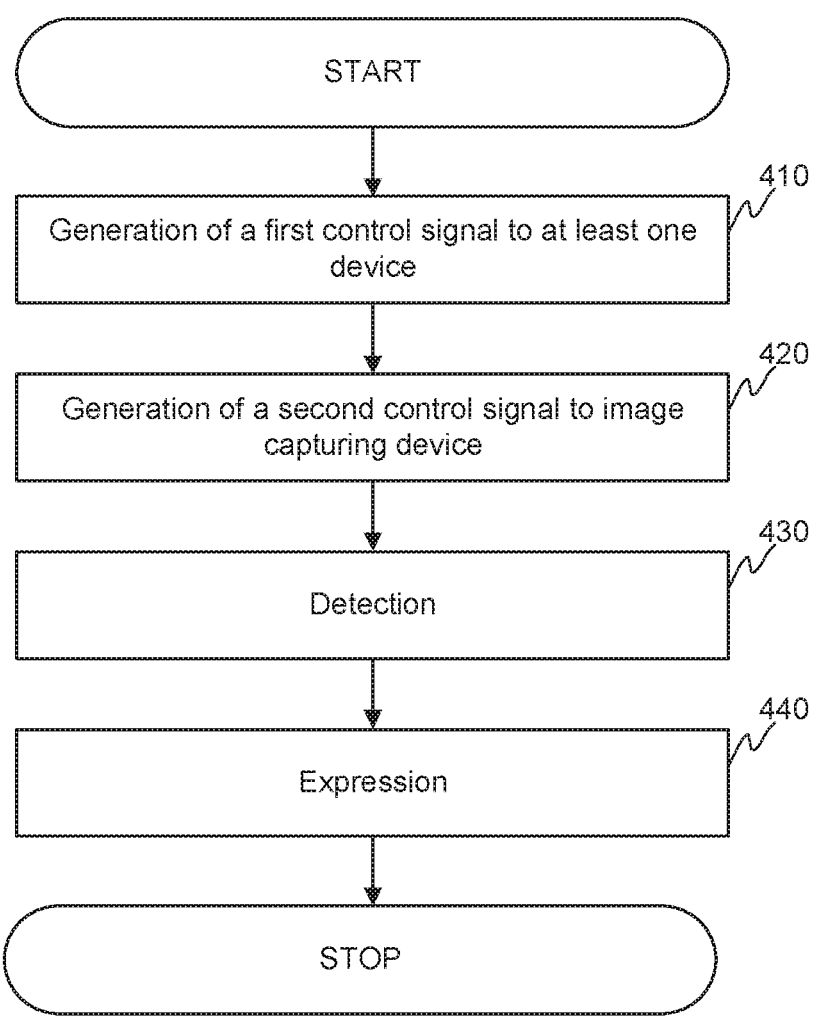
FIG. 4 illustrates schematically a method according to an embodiment of the invention.

Next, some aspects of the present invention are discussed from the control device 210 point of view. As mentioned according to an example of the invention the control device 210 may be a device that is configured to control overall operation of a diagnostics solution by means of which it is possible to determine operational condition of at least some entities belonging to the elevator system. The control device 210 is schematically illustrated in FIG. 3. The control device 210 may comprise a processing unit 310 including one or more processors, one or more memories 320 and one or more communication interfaces 330 which entities may be communicatively coupled to each other with e.g. a data bus. The communication interface 330 may comprise necessary hardware and functionality for coupling the control device 210 into the communication bus in the elevator system. Naturally, the control device 210 may also be coupled directly to another entity through the communication interface. The communication interface may implement either wired or wireless communication protocol and has necessary hardware thereto. The communication interface 330 may be at least partly controlled by the one or more processors 310 e.g. by executing portions of computer program code 325 stored in the one or more memories 320. Moreover, the computer program code 325 may define instructions that cause the control device 210 to operate as described when at least one portion of the computer program code 325 is executed by the processing unit 310. Naturally, the control device 210 schematically illustrated in FIG. 3 does not comprise all elements of the control device 210. For example, the power related elements needed for bringing an electrical device, such as the control device 210, into operation are not shown in FIG. 3.

The control device 210 of the arrangement may be configured to control the devices in the COP 100, but also the image capturing device 130 if it is separate entity to the COP 100. Additionally, it may be configured to perform predetermined tasks in response to controlling of the mentioned entities as well as to communicate with any further entities. In order to perform diagnostics for the COP 100, and at least to some devices therein, a non-limiting example of the procedure may be the following. The control device 210 may be configured to generate a control signal to the at least one device 110 in order to set an operating state of the at least one device 110, such as cause the device 110 in question to generate a visual representation in response to a receipt of the control signal. In some other example the control signal may cause the device 110 in question to cancel the generation of the visual representation in response to a receipt of the control signal. The generated control signal may e.g. carry an indication on the device 110 which shall generate the visual representation, and a controller residing in the COP 100 in at least some embodiment may interpret the indication accordingly in order to cause the device 110 in question to generate the visual representation. The control device 210 may also be configured to activate the image capturing device 130 e.g. in response to the generation of the control signal to the at least one device 110. Alternatively, the image capturing device 130 may be configured to capture images in a continuous mode i.e. by generating video frames. The activation of the image capturing device 130 refers to an idea that the image capturing device 130 is activated to capture an image when the control signal is given to the device 110 for generating the visual representation, and in that manner it is possible to capture at least one image on at least portion of the device 110 when the visual representation should be activated. Moreover, in response to the capturing of the image through the reflective surface 220 the control device 210, according to the present invention, may be configured to analyze the captured image data for detecting if the visual representation generated by the at least one device 110 is set in accordance with the control signal or not. The analysis, and thus the detection, may comprise a comparison of the visual representation generated by the at least one device 110 to a reference data. The reference data may refer to at least one reference data value comparable to at least one value derivable from the data representing the captured image. The at least one reference data may e.g. be a color value or contrast value or similar of one or more data items, such as pixels, residing e.g. in a certain position in the captured image. Alternatively or in addition, the reference data may be a reference image data generated in a predetermined manner, as will be discussed. In other words, the at least some portions of data derivable from the captured image may be compared to the reference data, and if comparison indicates that compared value or values meet one or more predetermined rules it may be concluded that the visual representation is generated by the at least one device in accordance with the control signal. In one embodiment of the invention the predetermined rule refers to that the compared value or values correspond to each other within a certain margin. In some other embodiment the predetermined rule refers to that the compared value or values deviate from each other more than a predetermined value. In case the analysis generates a detection that the control signal generates a visual representation in the device 110 in question a detection result may be set, in accordance with a detection, to express that the operational condition of the at least one device 110 is normal, i.e. it operates properly. On the other hand, if the analysis generates a detection that the control signal to the device 110 in question did not cause the generation of the visual representation by the device 110, a detection result may be set to express that the operational condition of the at least one device 110 deviates from the normal. This may be interpreted as a malfunction of the device 110. The control device 210 may be configured to generate a signal to a data center, which signal may carry information on the detection result. Especially, if the detection result indicates that the operational condition of the at least one device 110 deviates from the normal, the signal may be generated for informing the data center, or similar, on the outcome of the diagnostics.

As mentioned, the diagnostics operation as described may be performed to the devices 110 belonging to the elevator car control panel 100. In case the elevator control panel 100 comprises a plurality of devices 110 the diagnostics operation may be performed individually to each device 110. Alternatively, the diagnostics operation may be performed concurrently to at least some of the devices 110. This refers to an implementation that the control device 210 is configured to generate a control signal to the COP 100 for causing a plurality of devices 110 to set their operating state in accordance with the control signal, such as to generate the visual representations. This happens if they operate properly. The image capturing device may be configured to capture an image as described above and the analysis function may be configured to perform the analysis in view of the information on the devices 110, which were instructed to generate the visual representation. In other words, the analysis function may be configured to determine if the captured image data deviates from the reference value or reference values corresponding e.g. to a situation when the device 110 or the devices 110 generate visual representations in accordance with instructions carried in the control signal.

In case the COP 100 is implemented with a device called a touch screen a specific diagnostics program may be prepared for it. For example, the control device 210 may generate one or more control signals to the COP 100 implemented with the touch screen, which causes the touch screen to display one or more predetermined symbols, or similar, in predetermined locations on the screen at a certain instant of time. Such representations of the same or different symbols may be arranged to happen sequentially e.g. in different locations on the screen. The image capturing device 130 may be configured to capture images at the instants of time when the representation, or representations, are instructed to be displayed on the screen. Now, the control device 210 may be configured to compare the data representing each of the captured image to the reference data specific to that situation, and to determine if the touch screen operates properly. The control device 210 may be configured to detect, through the analysis, e.g. if some section of the touch screen does not operate properly.

In the description above it is described some exemplifying scenarios for diagnosing an operational condition of at least one device 110 of an elevator car control panel. The exemplifying scenarios as described are based on an idea that the control device 210 is configured to control the overall operation of the arrangement in the manner as described when the diagnostics is done as well as to perform the analysis in a defined manner. However, in some embodiment of the present invention the control device 210 may be implemented in a distributed manner i.e. there are a plurality of computing devices configured to perform the diagnostics operation. For example, a computing device may be arranged locally to perform the control operation of the mentioned entities within the elevator car, but the captured image may be transmitted with any other information, such as with information disclosing information on the control signal generated to the at least one device 110 in order to generate the visual representation if the at least one device 110 operates normally 110, to another computing device for the analysis. The other computing device may e.g. be a device residing in a data center monitoring an operation of one or more elevator systems, for example. The computing devices may be configured to communicate with each other over a communication network, such as over a data network or a mobile communication network. A further example of an implementation of the controlling function in the distributed manner may be that a first control device is arranged to generate the control signals to the device 110 in the COP 100 and the first control device may be configured to generate an acknowledgement signal to a second control device for causing the second control device to generate a control signal to an image capturing device 130 for capturing at least one image at least from the device in question through a reflective surface. Moreover, a third control device may receive the captured image or images from the second control device with any other information and the third control device may be configured to perform the analysis. The number of control devices in any of the exemplifying embodiments may reside locally in the elevator system or distantly in another location to the elevator system or they may be distributed in different locations.

In the above given description, the focus has mainly been in describing the setup of the arrangement as well as in giving some examples of the diagnosing operation. However, there are some further aspects relating to the invention which may be implemented in some embodiments of the invention. Namely, to perform the diagnostics properly there are some optimal environments for that purpose. Since the diagnostics operation is based on capturing an image on the at least one device 110 through the reflected surface as described, it may be performed only when there are no obstacles, such as passengers of the elevator, in the elevator car during the diagnostics operation. Hence, the control device 210 may be configured to trigger the diagnostics operation according to pre-defined rules stored in a memory accessible to the control device 210. According to an embodiment of the present invention the triggering rule for the diagnostics operation may be time based. For example, a time scheme for performing the diagnostics operation may be defined in the control device 210 so that the control device 210 is configured to initiate the diagnostics operation according to the time scheme. For example, the instants of time for the time scheme may be selected so that it is probable that the elevator is not in use. For example, at least one instant of time may be at nighttime. Further time-based definitions as triggers may be defined, such as defining days when the diagnostics shall be make. In some other embodiment further arrangements with respect to performing of the diagnostics may be defined, such as controlling some further functions of the elevator system. For example, in some embodiment of the invention the control device 210 may be configured to obtain data from any sensor, wherein the sensor data may be used for evaluating if the elevator is occupied or not. The sensor may e.g. refer to the image capturing device 130 residing in the elevator car. In other words, the control unit 210 may be configured to generate a control signal to the image capturing device in order to take an image and perform a perform an analysis for detecting if there are passengers in the elevator car or not. Alternatively or in addition, data obtained from other sensors may also be used. The other sensors may e.g. refer to weight sensors configured to monitor the weight of the elevator car. From that data it is possible to determine if there are passengers in the elevator car or not. Moreover, any other sensors residing e.g. in the elevator car doors, which may generate indications on passengers traveling to and from the elevator car, may be used for determining if the elevator car is occupied or not. All in all, the triggering of the diagnostics procedure may be based on detection that the elevator car is not occupied. Alternatively or in addition, the diagnostics procedure may be triggered in response to detection that the elevator system, or the elevator car in question, is in a certain mode. For example, the elevator system may be in active state and in inactive state. The inactive state may e.g. refer to a stand-by-mode. Hence, the diagnostics procedure may be triggered if the control device 210 detects that the elevator system is in a predetermined state, such as in the stand-by-mode, for example. The detection may be based to state monitoring function implemented in the control device 210, which is configured to obtain necessary input information for concluding the state of the elevator system, for example.

Still further, in some embodiments of the present invention further control functions may be performed for enhancing the diagnostics procedure. Namely, the control device 210 may be configured to control a diagnostics environment optimal for the diagnostics operation. For example, in response to detection that the diagnostics operation may be performed, the control unit 210 may adjust one or more parameters affecting state of the elevator car by generating an applicable adjustment control signal. The state of the elevator car may e.g. refer to one or more characteristic of the at least one device 110 under diagnose, such as brightness of the visual representation or color of it. Further, the environment may be controlled so that the lighting of the elevator car is adjusted optimal for the diagnosing procedure. For example, in some implementation the control device 210 may be configured to generate a control signal causing switching off the lights in the elevator car prior to generating the control signal to the at least one device 110 in order to improve the detection as the generation of the visual representation, or absence of it, is better detected in dark.

The diagnostics procedure may also be enhanced by controlling the image capturing device to capture a plurality of images on the at least one device 110. The capturing of images may refer to a situation in which the control device 210 is configured to generate a prior control signal to the image capturing device 130 for capturing the image prior to generating the control signal causing the at least one device 110 to set its operating state in accordance with the control signal, such as to generate a visual representation. In response to the capture of the image the control device 210 may be configured to generate the control signal to the at least one device 110 to cause the device 110 to set the operating state, such as to generate the visual representation, and the control device 210 may be configured to the generate a control signal for capturing another image with the image capturing device 130. In the analysis phase the control device 210 configured to perform the analysis may be configured to compare the image data, or one or more data values derived therefrom, and based on the comparison to determine if the device in question operates as it is configured to in response to the control signal, or signals. Alternatively, the image data of the captured images may be compared to reference data pre-generated for situations corresponding to the image capturing situation. The embodiment according to the description allows detection of situations wherein one or more devices 110 under diagnosis are jammed to generate visual representation permanently, for example, and the unchanged state may be detected. The embodiment is also applicable if the device 110 in question generates a plurality of different visual representations and they need to be identified and detected to determine if the device 110 operates in a normal way.

The generation of the control signal for generating the visual representation shall also be understood to comprise a situation where the control signal causes a change of the state of the device 110 under diagnosis. In other words, the present invention is applicable to a situation in which the device 110 under diagnosis changes its state from one to another. E.g. the device may generate a visual representation in one state and the generated control signal may cause canceling of the generation of the visual representation. The change of the state may be detected in the analysis phase, as the reference data is established accordingly. However, the change of the state is non-limiting example, and the invention may be applied in detecting if the at least one device sets its operating state according to one or more instructions carried in the control signal.

Some aspects of the present invention may relate to a method for diagnosing an operational condition of at least one device 110 of an elevator car. In the method the operations as described may be performed. The method may comprise: generating 410, by a control device 210, a first control signal to the at least one device 110 to set the operating state of the at least one device 110; generating 420, in response to the generation of the first control signal to the at least one device 110 to set the operating state of the at least one device 110, a second control signal to the image capturing device 130, the second control signal to the image capturing device 130 is configured to cause the image capturing device 130 to capture an image at least on the portion of the at least one device 110 seen by the image capturing device 130 through the at least one reflective surface 220; detect 430, from the data representing the captured image, if the visual representation generated by the at least one device 110 is set in accordance with the first control signal; and set, in accordance with a detection, a detection result to express 440 one of the following: i) the operational condition of the at least one device 110 is normal, ii) the operational condition of the at least one device 110 deviates from the normal. Further aspects relating to the method are disclosed previously in the description.

The arrangement as disclosed may be implemented in an elevator system, as described. Furthermore, the method as disclosed may be implemented, at least in part, with a computer program code executed by the processing unit 310, for example.

Figure 5:
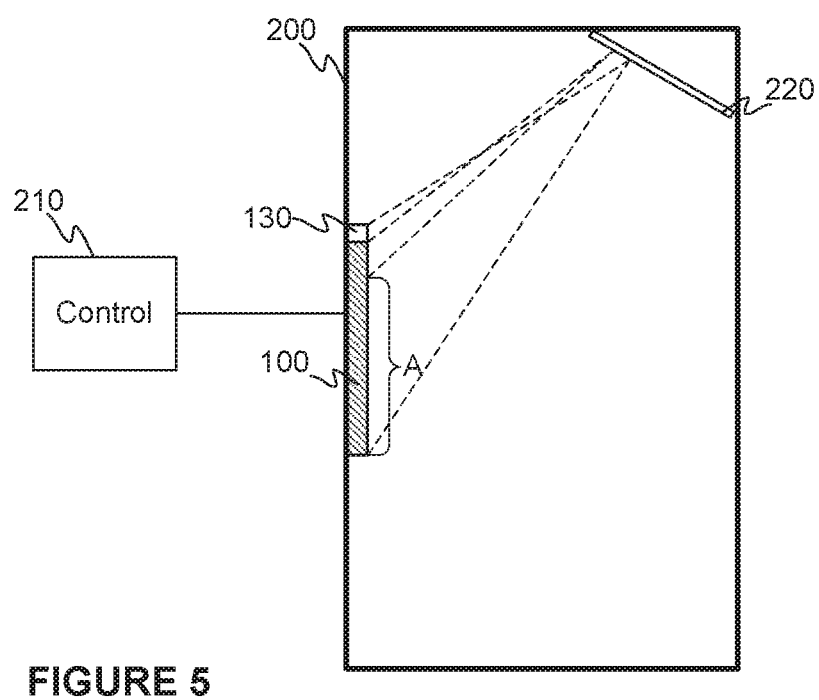
FIG. 5 illustrates schematically another embodiment of the arrangement according to the invention.

In the description of the invention above it is mainly indicated that the reflective surface 220 is positioned on an opposite wall to the COP 100 and the image capturing device 130, as schematically illustrated in FIG. 2. However, the invention is not limited to such embodiment only, but any arrangement in which the reflective surface 220 is positioned with respect to the image capturing device 130 so that the at least one device 110 under diagnosis is visible over the reflection may be used in the described manner. For example, the reflective surface 220 may be positioned on the wall next to the wall into which the COP 100 and the image capturing device 130 are positioned as schematically illustrated in FIG. 5, and the image capturing device 130 is directed so that the image may be captured from the environment seen over the reflective surface 220. Hence, the reflective surface 220 is positioned so that the path of reflection between the image capturing device 130 and at least portion of the at least one device 110 meets. Further, in some embodiments of the invention the path of reflection between the mentioned entities may be arranged with a plurality of reflective surfaces arranged mutually so that the reflection may be established between the entities.

In the description of the present invention with some non-limiting examples it is indicated that the at least one device under diagnostics and/or the image capturing device may reside in the elevator car control panel. However, the present invention is not only limited to such implementation, but any of the mentioned entities may be separate entities controlled by the at least one control device 210 in the manner as described in order to achieve the advantageous results, or at least part of them, of the present invention.

The specific examples provided in the description given above should not be construed as limiting the applicability and/or the interpretation of the appended claims. Lists and groups of examples provided in the description given above are not exhaustive unless otherwise explicitly stated.

What is claimed is:

1. An arrangement for diagnosing an operational condition of at least one device of an elevator car, the at least one device being a device having at least two operating states that are distinguishable from each other with at least one visual representation generated by the at least one device, the arrangement comprising:
   an image capturing device;
   at least one reflective surface arranged to a position in the elevator car forming a path of reflection between the image capturing device and a portion of the at least one device such that the portion of the at least one device is visible to the image capturing device through the at least one reflective surface; and
   a control device configured to generate a first control signal to the at least one device to set an operating state of the at least one device, the operating state of the at least one device being one of the at least two operating states,
   wherein the control device is further configured to
      generate a second control signal to the image capturing device in response to the generating the first control signal to the at least one device to set the operating state of the at least one device, the second control signal to the image capturing device being configured to cause the image capturing device to capture an image at least on the portion of the at least one device visible to the image capturing device through the at least one reflective surface, detect, based on processing data representing the captured image, whether the at least one visual representation generated by the at least one device is set in accordance with the first control signal, and set, in accordance with the detecting whether the at least one visual representation generated by the at least one device is set in accordance with the first control signal, a detection result to express one of
   i) the operational condition of the at least one device is normal, or
   ii) the operational condition of the at least one device deviates from the normal, wherein the control device is further configured to generate a triggering signal for initiating the diagnosing of the operational condition of the at least one device based on a detection that the elevator car is not occupied.

2. The arrangement according to claim 1, wherein the control device is configured to express the operational condition of the at least one device as normal in response to a detection that the at least one visual representation is set in accordance with the first control signal.

3. The arrangement according to claim 1, wherein the control device is configured to perform the detecting of whether the at least one visual representation generated by the at least one device is set in accordance with the first control signal by comparing the at least one visual representation generated by the at least one device to a reference data.

4. The arrangement according to claim 3, wherein the reference data is one of
   at least one reference data value, wherein the at least one reference data value is comparable to at least one value that is derivable from the data representing the captured image, or
   reference image data.

5. The arrangement according to claim 3, wherein the control device is configured to retrieve the reference data from a memory accessible to the control device.

6. The arrangement according to claim 3, wherein the control device is configured to generate the reference data, prior to the generating the first control signal to the at least one device to set the operating state of the at least one device, by generating a prior control signal to the image capturing device for capturing the image at least on the portion of the at least one device visible the image capturing device through the at least one reflective surface.

7. The arrangement according to claim 1, wherein the control device is further configured to, prior to the capturing the image, generate an adjustment control signal for adjusting a diagnostics environment in the elevator car.

8. The arrangement according to claim 7, wherein the adjusting the diagnostics environment includes at least one of
   adjusting a parameter affecting at least one characteristic of the at least one visual representation generated by the at least one device, or
   adjusting a lighting of the elevator car.

9. The arrangement according to claim 1, wherein the control device is configured to generate the triggering signal for initiating the diagnosing of the operational condition of the at least one device further based on at least one of pre-defined time scheme for the triggering signal, or
operating mode of the elevator car.

10. The arrangement according to claim 1, wherein an elevator car control panel includes at least one of
   at least one device, or
   the image capturing device.

11. A method for diagnosing an operational condition of at least one device of an elevator car, the at least one device being a device having at least two operating states that are distinguishable from each other with at least one visual representation generated by the at least one device, the method comprising:

generating, by a control device, a first control signal to the at least one device to set an operating state of the at least one device, the operating state of the at least one device being one of the at least two operating states;

generating, in response to the generating the first control signal to the at least one device to set the operating state of the at least one device, a second control signal to the image capturing device, the second control signal to the image capturing device being configured to cause the image capturing device to capture an image at least on a portion of the at least one device visible to the image capturing device through at least one reflective surface;

detect, based on processing data representing the captured image, whether the at least one visual representation generated by the at least one device is set in accordance with the first control signal;

set, in accordance with the detecting whether the at least one visual representation generated by the at least one device is set in accordance with the first control signal, a detection result to express one of
   i) the operational condition of the at least one device is normal, or
   ii) the operational condition of the at least one device deviates from the normal; and generating, by the control device, a triggering signal for initiating the diagnosing of the operational condition of the at least one device based on a detection that the elevator car is not occupied.

12. The method according to claim 11, further comprising:
   expressing, by the control device, the operational condition of the at least one device as normal in response to a detection that the at least one visual representation is set in accordance with the first control signal.

13. The method according to claim 11, wherein the detecting of whether the at least one visual representation generated by the at least one device is set in accordance with the first control signal is performed by comparing the at least one visual representation generated by the at least one device to a reference data.

14. The method according to claim 13, wherein the reference data is one of
   at least one reference data value, wherein the at least one reference data value is comparable to at least one value that is derivable from the data representing the captured image, or
   reference image data.

15. The method according to claim 13, further comprising:
   retrieving, by the control device, the reference data from a memory accessible to the control device.

16. The method according to claim 13, wherein the method further comprising:
   generating, by the control device, the reference data, prior to the generating the first control signal to the at least one device to change the operating state of the at least one device, by generating a prior control signal to the image capturing device for capturing the image at least on the portion of the at least one device visible to the image capturing device through the at least one reflective surface.

17. The method according to claim 11, further comprising:
generating, by the control device prior to the capturing the image, an adjustment control signal for adjusting a diagnostics environment in the elevator car.

18. The method according to claim 17, wherein the adjusting the diagnostics environment includes at least one of
adjusting a parameter affecting at least one characteristic of the at least one visual representation generated by the at least one device, or
adjusting a lighting of the elevator car.

19. The method according to claim 11, further comprising:
generating, by the control device, the triggering signal for initiating the diagnosing of the operational condition of the at least one device further based on at least one of pre-defined time scheme for the triggering signal, or operating mode of the elevator car.

* * * * *